United States Patent [19]

Hall

[11] Patent Number: 5,429,888

[45] Date of Patent: Jul. 4, 1995

[54] BATTERY RECHARGING TECHNIQUE

[75] Inventor: John C. Hall, Saratoga, Calif.

[73] Assignee: Space Systems/Loral, Inc., Palo Alto, Calif.

[21] Appl. No.: 340,789

[22] Filed: Nov. 21, 1994

Related U.S. Application Data

[63] Continuation-in-part of Ser. No. 182,224, Jan. 14, 1994, Pat. No. 5,395,706.

[51] Int. Cl.$^6$ .................... H01M 10/44; H01M 12/06
[52] U.S. Cl. ..................................... 429/50; 429/101; 429/120; 320/35
[58] Field of Search .................. 429/50, 120, 101, 49, 429/223, 206, 247, 251, 254, 57, 59; 320/2-5, 35, 14, 21

[56] References Cited

U.S. PATENT DOCUMENTS 4,324,845  4/1982  Stockel .
4,567,119  1/1986  Lim .
4,680,241  7/1987  Dyer .

*Primary Examiner*—Anthony Skapars
*Attorney, Agent, or Firm*—Perman & Green

[57] ABSTRACT

A method is disclosed operating a nickel-hydrogen battery when the battery is less than fully charged. Specifically, battery recharge is completed at a temperature $T_1$, in the range of approximately $-10°$ C. to $-30°$ C., which is lower than a temperature $T_2$, in the range of approximately $-10°$ C. to $+5°$ C., at which discharge begins. The temperature $T_1$ is chosen to maximize the extent of the reaction represented by the equation:

$$Ni(OH)_2 + OH^- = NiOOH + H_2O + e^-.$$

versus the reaction represented by the equation:

$$2OH^- = \tfrac{1}{2}O_2 + H_2O + 2e^-$$

Subsequently, it is desirable to heat the battery to the temperature $T_2$ in readiness for discharge. A preferred recharge temperature is less than approximately $-10°$ C. The battery includes a positive electrode which may include electrochemically active $Ni(OH)_2$ possibly mixed with $Co(OH)_2$ and electrically conductive material having a resistivity less than approximately 0.1 ohm-cm, a negative electrode which is of a material which catalyzes the oxidation and reduction of $H_2$, and an electrolyte which is a solution of KOH. The foregoing principle can be applied to any battery which uses a nickel hydroxide positive electrode, specifically, to such batteries which have a condensed phase negative electrode such as metal hydride, zinc, iron and cadmium.

13 Claims, 3 Drawing Sheets

BATTERY RECHARGING TECHNIQUE

This is a continuation-in-part of application Ser. No. 08/182,224 filed Jan. 14, 1994, U.S. Pat. No. 5,395,706.

BACKGROUND OF THE INVENTION

I. Field of the Invention

The present invention relates generally to a method of operation of a nickel-hydrogen battery, and more particularly, to the method of recharging a nickel-hydrogen battery at a temperature which is substantially lower than the temperature at which discharge is performed. The invention also relates to the construction of any battery using a nickel hydroxide positive electrode which is so operated including batteries with negative electrodes of metal hydride, zinc, iron or cadmium. The invention has application for space purposes but is also of benefit for non-space purposes such as the powering of laptop computers and cellular telephones.

II. Description of the Prior Art

It is well recognized that optimum performance for nickel hydrogen spacecraft batteries requires that their temperature be controlled in the range of $+20°$ C. to $-10°$ C. Higher temperatures lead to lowered capacity due to the early on-set of the parasitic electrolysis reaction, e.g., $$2OH^- = \tfrac{1}{2}O_2 + H_2O + 2e^- \qquad (1)$$

Reaction (1) has been recognized in the prior art to reduce capacity as the operating temperature of the battery is increased. A key to the present invention has been the recognition that the critical temperature is that at which the battery is recharged and reaction (1) competes with the normal recharge reaction, e.g., $$Ni(OH)_2 + OH^- = NiOOH + H_2O + e^- \qquad (2)$$

Lower temperatures on the other hand have been found to lead to batteries which fail to operate. The reasons for this failure, prior to the present invention, were unclear as the freezing point of the electrolyte ($-61°$ C.) is well below the minimum operation temperature. The second key to the present invention has been the recognition that the lower temperature limit is due to a limitation in the ability of the battery to sustain high rate discharge required in satellites situated in a geosynchronous orbit (e.g., $\sim C/1.5$) as opposed to the lower rate recharge (e.g., $\sim C/10$).

Typical of the prior art as it relates to charging and discharging nickel batteries is U.S. Pat. No. 4,680,241 to Dyer. The Dyer patent concerns a method for partially or fully restoring the lost capacities of nickel batteries. In this instance, a nickel battery is cycled at least 10 times, with each cycle including a discharging step during which the capacity achieved at the end of the previous cycle is reduced by at least 5 percent, and a charging step. The charging rate employed during the charging step is greater than about C/10 per hour. Moreover, while the ratio of the amount of charge delivered to the battery during the charging step of each cycle to the amount of charge withdrawn from the battery during the previous cycle is greater than one, this ratio is chosen so that the temperature of the electrolyte of the battery does not exceed about 30° C.

It is clear, however, that the Dyer patent does not address the particular problem which the present invention is intended to solve.

It was in light of the state of the technology as just described that the present invention has been conceived and is now reduced to practice.

SUMMARY OF THE INVENTION

The present invention relates to a method of operating a nickel-hydrogen battery which increases its charge capacity. The method comprises the step of completing the recharging process for the battery at a temperature $T_1$, in the range of approximately $-10°$ C. down to $-30°$ C. which is lower than a temperature $T_2$, in the range of approximately $-10°$ C. to $+5°$ C., at which discharge customarily begins. At the onset of the recharge operation the temperature may be in the range of $+25°$ C. to $+40°$ C. However, as recharge proceeds, the temperature is caused to fall to the range of $-10°$ C. to $-30°$ C. which is optimum for full recharge. The temperature $T_1$ is chosen to maximize the extent of the reaction represented by the equation:

$$Ni(OH)_2 + OH^- = NiOOH + H_2O + e^- \qquad (2)$$

versus the reaction represented by the equation:

$$2OH^- = \tfrac{1}{2}O_2 + H_2O + 2e^- \qquad (1)$$

Subsequently, it is desirable to heat the battery to the temperature $T_2$ in readiness for discharge. A preferred recharge temperature is less than approximately $-10°$ C. The battery includes a positive electrode which may include electrochemically active $Ni(OH)_2$ (possibly mixed with $Co(OH)_2$) and electrically conductive material having a resistivity less than approximately 0.1 ohm-cm, a negative electrode which is of a material which catalyzes the oxidation and reduction of $H_2$, and an electrolyte which is a solution of KOH (typically 20% to 40% by weight).

The foregoing principle can be applied to any battery which uses a nickel hydroxide positive electrode, specifically, to such batteries which have a condensed phase negative electrode such as metal hydride, zinc, iron and cadmium.

Accordingly, a primary object of the invention is the provision of a unique method for increasing the capacity of a nickel-hydrogen battery.

Another object of the invention is to provide a method of increasing the capacity of a nickel-hydrogen battery by charging at a temperature, or within a range of temperatures, which is lower than the temperature at which discharge begins.

A further object of the invention is to provide such an improved method in which the extent of the reaction represented by the equation $2OH^- = \tfrac{1}{2}O_2 + H_2O + 2e^-$ is maximized in relation to the reaction represented by the equation $Ni(OH)_2 + OH^- = NiOOH + H_2O + e^-$.

Still another object of the invention is to provide a capacity enhanced battery using a nickel hydroxide positive electrode and a condensed phase negative electrode of metal hydride, zinc, iron, or cadmium.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 1:
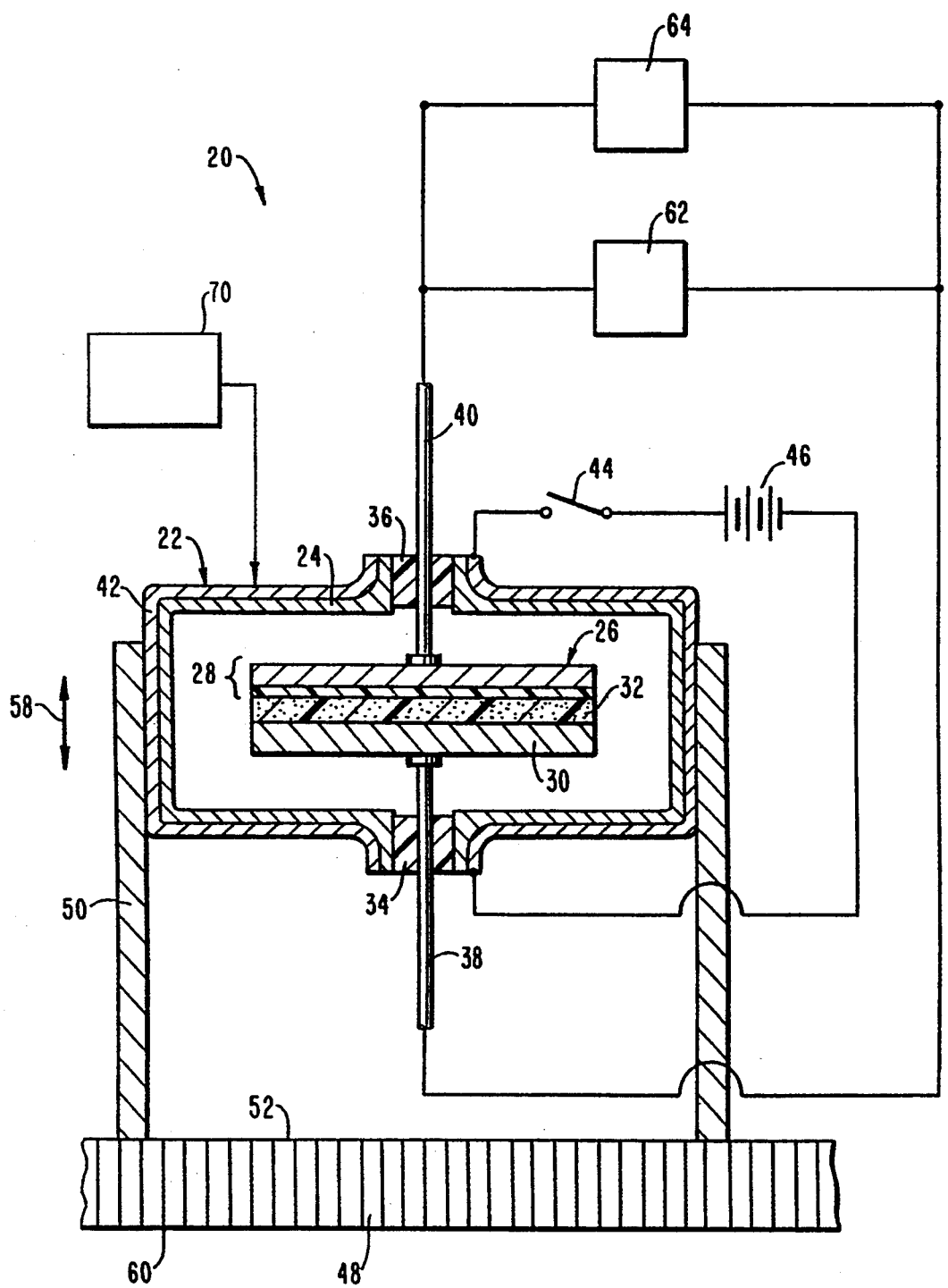
FIG. 1 is a diagrammatic representation of a battery system embodying the present invention and including a cross section view of a cell of a nickel-hydrogen battery used with the system.

As shown in FIG. 1, a nickel-hydrogen battery system 20 of the type with which the invention is concerned includes a cell 22 provided with a pressure vessel 24 and an electrode stack 26 within the pressure vessel. The electrode stack 26, in turn, includes a positive electrode 28, a negative electrode 30, and a porous separator 32 which also serves as an electrolyte reservoir for storing excess electrolyte within the electrode stack 26. The porous separator 32 may be composed of zirconia, asbestos, plastic, and the like. The positive electrode 28 includes electrochemically active nickel hydroxide and electrically conductive material having a resistivity less than approximately 0.1 ohm/cm. The negative electrode 30 is of a material which catalyzes the oxidation and reduction of hydrogen gas and, in typical fashion, the electrolyte is a solution of potassium hydroxide (KOH).

The cell 22 also has electrical lead throughs 34, 36 through which negative and positive electrical leads 38, 40 respectively pass.

A suitable electrically energized heater jacket 42 overlies the pressure vessel 24. By closure of a switch 44, heating elements within the heater jacket 42 can be energized by a suitable source 46 of EMF for heating the cell 22.

The cell 22 is thermally connected to an optical space radiator (OSR) 48 via a thermally conductive sleeve 50. The sleeve 50 is mounted on one side 52 of the OSR 48 and slidably envelops an outer peripheral surface 42 of the cell 22. A side 60 of the OSR 48 opposite side 52 faces black space. The cell is continuously cooled by the OSR and its temperature is determined by bucking the OSR with the heater jacket 42. Cell 22 is also suitably subjected to a source of refrigeration 70.

On a spacecraft which is the intended venue for the cell 22, a solar array 62 is the primary power source indicated for recharging the cell 22 and a typical load 64 is indicated for the discharge cycle of the cell. The source of refrigeration 70, in this instance, is the space environment.

Figure 2:
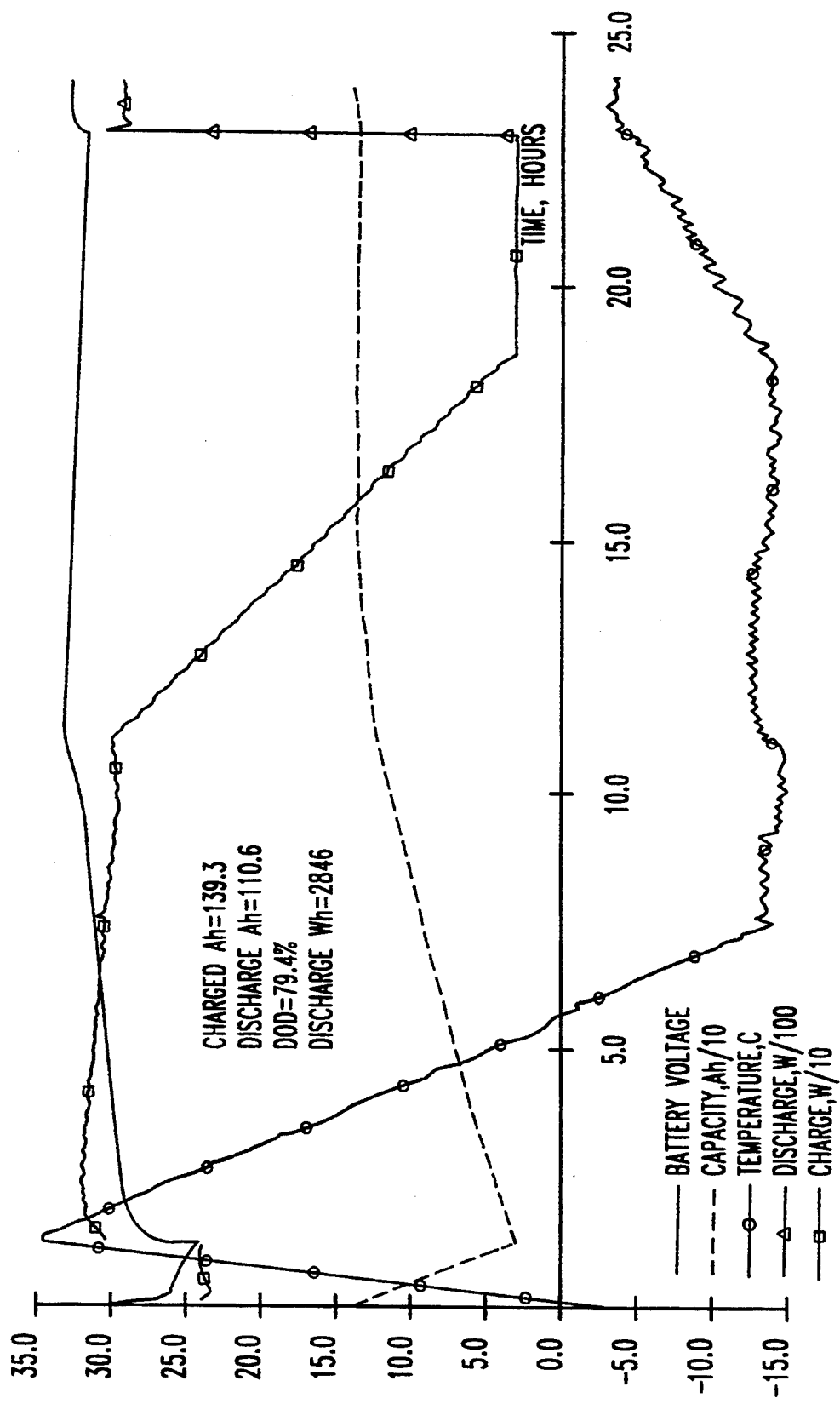
FIG. 2 is a graph depicting the operation of a cell according to the invention, presenting various parameters over the course of time.

FIG. 2 presents a typical operation according to the invention. As seen therein, as a discharging operation ensues, the temperature of the cell 22 rises rapidly over the course of a 72 minute eclipse discharge to a temperature of approximately 34° C. This represents the customary temperature increase which occurs whenever a battery is being discharged. Cooling is effected by conduction of heat from the cell via its sleeve to the OSR which radiates to deep space. The temperature rise in FIG. 2 is due to the discharge heat generation rate exceeding the OSR heat dissipation rate. Charging of the battery is then effected by means of the solar array 62. As charging proceeds, the temperature of the cell 22 decreases as a) the recharge rate is typically less than 20% of the discharge rate, b) battery operates endothermically during much of recharge and c) the OSR dissipates heat faster than the battery generates heat until a minimum temperature is reached between five and six hours after charging was initiated. The benefit of the invention is achieved by allowing the temperature to decline in such a manner that at the end of a charging process the cell 22 is at a temperature which is lower than that at which discharge begins. Thus, when charging ends approximately 17 hours after it began, at the beginning of a quiescent period, the temperature of the cell is again raised to a temperature which is preferably within the range of −10° C. to +10° C. This temperature rise is achieved by closure of the switch 44 to energize the heater jacket 42. Approximately 22 hours after charging began, the cell 22 is ready for discharge.

Figure 3:
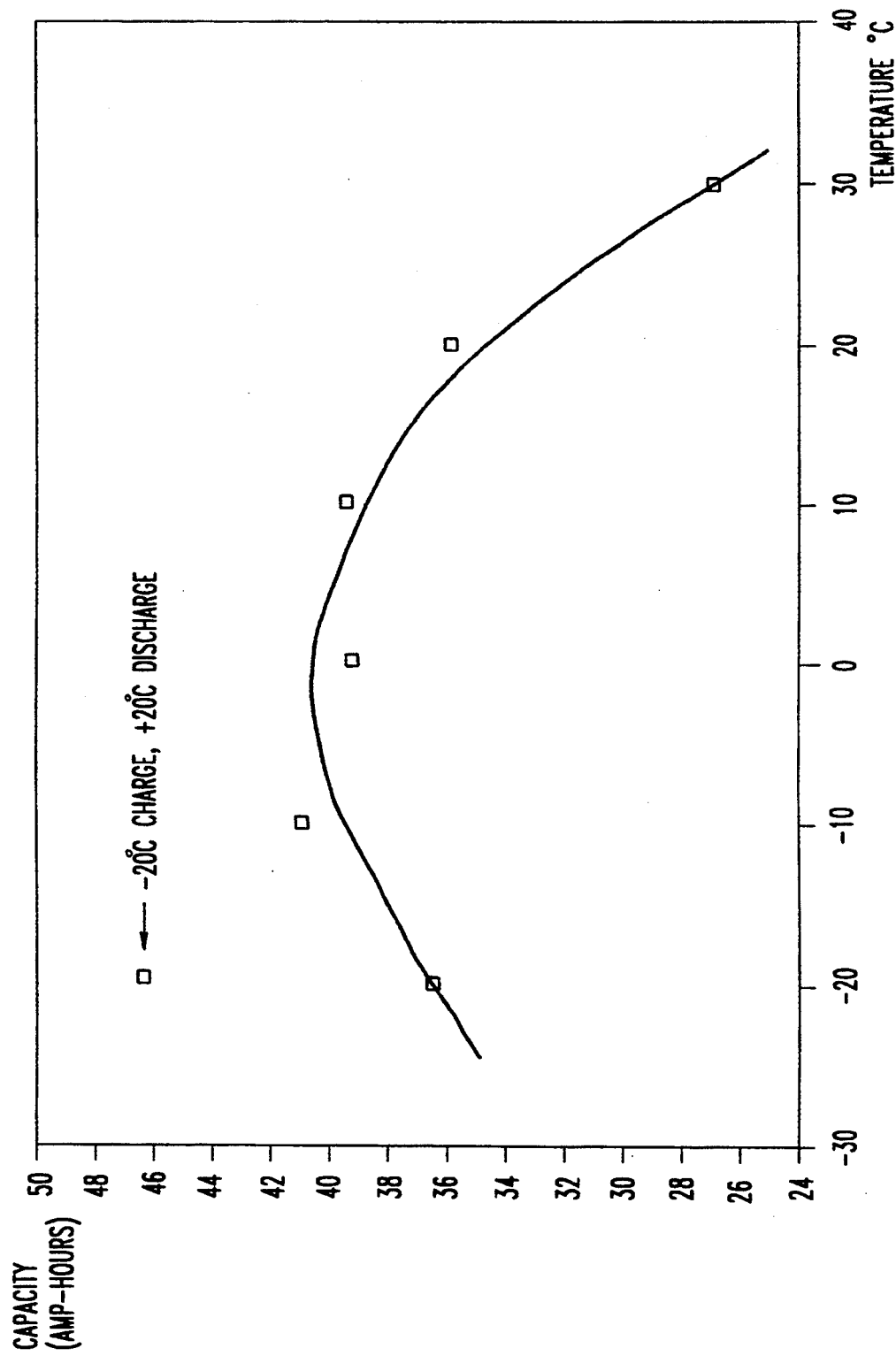
FIG. 3 is a graph presenting nickel-hydrogen cell capacity versus isothermal charge and discharge temperature.

In FIG. 3, a plot is provided of nickel-hydrogen cell capacity versus the isothermal charge and discharge temperature. As can be seen in FIG. 3, the delivered cell capacity peaks at a temperature between 0° C. and +10° C. Also provided in the figure is a datum in which the cell is charged at −20° C. and discharged at +20° C. As can be seen, this bimodal temperature operation leads to the highest cell capacity. The interpretation of this result is that the kinetics of cell discharge are improved at high temperature whereas the kinetics of cell charging are more optimum at lower temperature. In a second test, a cell was (a) charged and discharged at −20° C., (b) charged at −20° C., allowed to stand at open circuit for 4 hours and then discharged at −20° C. and (c) charged at −20° C., warmed to +10° C. and discharged. Case (c) operated in a fashion comparable to case (a). The interpretation of these results is as follows:

(i) in case (a), the internal heating of the cell was sufficient to raise its temperature to a point at which it was operable at an abnormally low temperature;

(ii) in case (b), the open circuit period led to a decrease in the cell internal temperature to a point at which the cell could no longer support a high rate of operation; and (iii) in case (c), the cold recharge capacity which could not be extracted in case (b) was available once the temperature was increased to a point at which the battery was operable.

As described above, the capacity of the nickel hydroxide positive electrode is limited by the ability to charge the nickel electrode due to the competition between the parasitic electrolysis reaction (1) and the useful recharge reaction (2).

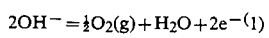

In the referenced application a method for increasing the capacity of nickel hydrogen batteries is described in which the recharging temperature is in the range or +10° C. to −30° C. and the discharging temperature is in the range of $-10°$ C. to $+50°$ C. The effect of the two temperatures is to promote the recharge reaction over the electrolysis reaction by low temperature recharge while promoting cell discharge by the elevated discharge temperature.

The same principal should allow the capacity enhancement of any battery which uses a nickel hydroxide positive electrode and a negative electrode such as metal hydride, zinc, iron, and cadmium. In fact, however, it has been found that the capacity of conventionally built solid negative electrode batteries is not materially increased by practicing the previously described bimodal temperature operation. Conventional batteries fail to demonstrate a thermally induced capacity enhancement due (1) to failure to provide sufficient negative solid or, at least, condensed phase active material to accommodate the enhanced positive electrode capacity, and (2) to use of a separator design which does not allow for a ready balancing of the local electrode concentration at the positive electrode as the battery is recharged.

Thus, as to (1), additional metal alloy, zinc, iron, cadmium, and the like, must be included in a cell to realize a thermally induced capacity increase. This is not an issue for nickel hydrogen as the positive electrode intrinsically creates the required negative discharge state active material ($H_2O$) as it is charged. For the condensed phase materials, however, the mass of the negative electrode must be enlarged proportionately to the increased capacity of the positive electrode. Specifically, according to the invention, the negative electrode must have a coulombic capacity sized to balance the increased capacity of the positive electrode when the battery is charged at a temperature $T_1$ between approximately $+10°$ C. and $-30°$ C. which is lower than a temperature $T_2$, in the range of approximately $-10°$ C. to $+5°$ C., at which discharge begins. The material is then converted to $H_2$ by the negative recharge reaction (3):

$$2H_2O + 2e^- = H_2(g) + 2OH^- \qquad (3)$$

As to the separator design, it is well recognized that the charge acceptance of the nickel hydroxide electrode decreases as the KOH(aq) electrolyte concentration decreases. This occurs locally at the positive electrode when water is formed during recharge. The degree to which the electrolyte concentration decreases is a function of its viscosity (which increases as temperature decreases thereby decreasing electrolyte diffusion) and the separator. Nickel hydrogen batteries typically employ highly porous $ZrO_2$ woven ceramic separators which (a) allow rapid diffusion of the electrolyte and (b) contain a large electrolyte quantity that acts to buffer concentration changes. Nickel hydrogen batteries thus exhibit thermally induced capacity enhancement. Conventional solid negative electrode batteries typically employ fined pored thin polymeric separators such as Pellon ® brand (nylon) or Cellgard ® brand (polypropylene) which may tend to inhibit electrolyte diffusion and contain a minimum amount of buffering electrolyte.

In contrast, preferred separators of woven cloth, plastic felts and mats of $ZrO_2$ and $Al_2O_3$ felt are highly porous with a porosity in the range of approximately 10% to 50% bulk density.

In summary, thermally induced capacity enhancement can be achieved in batteries which employ a nickel hydroxide positive electrode and condensed phase negative electrodes such as metal hydride, zinc, iron and cadmium. This enhancement is obtained by optimizing the design of the batteries by increasing the amount of negative active material to accommodate the increased positive electrode capacity. A further benefit is achieved by selection of highly porous separators, that is, with large porosity in the approximate range of 10% to 50% bulk density to promote electrolyte concentration balancing between the opposing electrodes during recharge. It is also considered desirable to include an additional quantity of electrolyte in the positive electrode and/or separator to buffer local concentration changes during recharge.

As previously stated, an application of the present invention is in an outer space environment wherein the lower temperature ranges required for charging the battery are readily available. For non-space applications, such as for use in laptop computers and cellular telephones, one skilled in the art will appreciate that a low temperature environment may be provided by conventional refrigeration techniques. This may be indicated by the refrigeration source 70 to provide the low temperature environment for recharging the cell 22.

While preferred embodiments of the invention have been disclosed in detail, it should be understood by those skilled art that various other modifications may be made to the illustrated embodiment without departing from the scope of the invention as described in the specification and defined in the appended claims.

I claim:
1. A battery comprising:
a nickel hydroxide positive electrode;
an electrolyte;
a condensed phase negative electrode having a coulombic capacity sized to balance the increased capacity of the positive electrode when said battery is charged at a temperature $T_1$ between approximately $+10°$ C. and $-30°$ C. which is lower than a temperature $T_2$, in the range of approximately $-10°$ C. to $+5°$ C., at which discharge begins.

2. A battery as set forth in claim 1
wherein temperature $T_1$ is chosen to maximize the extent of the reaction represented by the equation:

$$2OH^- = \tfrac{1}{2}O_2 + H_2O + 2e^-$$

versus the reaction represented by the equation:

$$Ni(OH)_2 + OH^- = NiOOH + H_2O + e^-.$$

3. A battery as set forth in claim 1
wherein the positive electrode includes electrochemically active $Ni(OH)_2$ and electrically conductive material having a resistivity less than approximately 0.1 ohm-cm;
wherein the negative electrode is of a material which catalyzes the oxidation and reduction of $H_2$; and
wherein the electrolyte is a solution of KOH.

4. A battery as set forth in claim 1
wherein said negative electrode is a condensed phase material selected from the group consisting of metal hydride, zinc, iron, and cadmium.

5. A battery as set forth in claim 1
wherein said negative electrode is hydrogen.

6. A battery as set forth in claim 1
including a porous separator intermediate said positive electrode and said negative electrode, said separator being of a material selected from the group consisting of $ZrO_2$, woven cloth, plastic felts, and mats, and $Al_2O_3$ felt.

7. A battery as set forth in claim 1 including:

a source of refrigeration for cooling said battery to a temperature $T_1$ in the range between $+10°$ C. and $-30°$ C.

8. A method of operating a battery comprising a nickel hydroxide positive electrode and an electrolyte comprising the step of:

charging the battery at a temperature $T_1$ between approximately $+10°$ C. and $-30°$ C. which is lower than a temperature $T_2$, in the range of approximately $-10°$ C. to $+5°$ C., at which discharge begins; and providing a condensed phase negative electrode having a coulombic capacity sized to balance the increased capacity of the positive electrode when said battery is charged at the temperature $T_1$.

9. A method of operating a battery as set forth in claim 8 wherein temperature $T_1$ is chosen to maximize the extent of the reaction represented by the equation:

$$2OH^- = \tfrac{1}{2}O_2 + H_2O + 2e^-$$

versus the reaction represented by the equation:

$$Ni(OH)_2 + OH^- = NiOOH + H_2O + e^-.$$

10. A method of operating a battery as set forth in claim 8 wherein the positive electrode includes electrochemically active $Ni(OH)_2$ and electrically conductive material having a resistivity less than approximately 0.1 ohm-cm;

wherein the negative electrode is of a material which catalyzes the oxidation and reduction of $H_2$; and wherein the electrolyte is a solution of KOH.

11. A method of operating a battery as set forth in claim 8 wherein the negative electrode is a condensed phase material selected from the group consisting of metal hydride, zinc, iron, and cadmium.

12. A method of operating a battery as set forth in claim 8 wherein the negative electrode is hydrogen.

13. A method of operating a battery as set forth in claim 8 wherein a porous separator intermediate the positive electrode and the negative electrode is a material selected from the group consisting of $ZrO_2$, woven cloth, plastic felts, and mats, and $Al_2O_3$ felt.

* * * * *